US012652687B2

(12) United States Patent
Peng et al.

(10) Patent No.: US 12,652,687 B2
(45) Date of Patent: Jun. 9, 2026

(54) SYSTEMS AND METHODS FOR POSITIONING

(71) Applicant: ZTE Corporation, Shenzhen (CN)

(72) Inventors: Focai Peng, Shenzhen (CN); Chuangxin Jiang, Shenzhen (CN); Mengzhen Li, Shenzhen (CN); Cong Wang, Shenzhen (CN); Zhiqiang Han, Shenzhen (CN); Juan Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 19 days.

(21) Appl. No.: 18/889,886

(22) Filed: Sep. 19, 2024

(65) Prior Publication Data

US 2025/0024479 A1 Jan. 16, 2025

Related U.S. Application Data

(63) Continuation of application No. PCT/CN2023/086716, filed on Apr. 6, 2023.

(51) Int. Cl.
*H04W 72/00* (2023.01)
*H04W 72/512* (2023.01)

(52) U.S. Cl.
CPC ................................. *H04W 72/512* (2023.01)

(58) Field of Classification Search
CPC .................................................. H04W 72/512
See application file for complete search history.

(56) References Cited

U.S. PATENT DOCUMENTS

| | | | |
|---|---|---|---|
| 2018/0242372 A1 | 8/2018 | Yang et al. | |
| 2020/0235881 A1 | 7/2020 | Choi et al. | |
| 2021/0329508 A1* | 10/2021 | Gopal .................. | H04B 7/0404 |
| 2022/0167301 A1 | 5/2022 | Goyal et al. | |
| 2022/0256519 A1* | 8/2022 | Jeon ...................... | G01S 7/0235 |
| 2023/0115192 A1 | 4/2023 | Nemeth et al. | |
| 2024/0259146 A1 | 8/2024 | Wu et al. | |
| 2025/0112742 A1* | 4/2025 | Keating ................ | H04W 64/00 |

FOREIGN PATENT DOCUMENTS

| | | | | |
|---|---|---|---|---|
| CN | 115529661 A | 12/2022 | | |
| CN | 115883290 A | 3/2023 | | |
| CN | 115884250 A | 3/2023 | | |
| WO | WO-2022/031824 A1 | 2/2022 | | |
| WO | WO-2022/067865 A1 | 4/2022 | | |
| WO | WO-2022/211901 A1 | 10/2022 | | |
| WO | WO-2024168598 A1 * | 8/2024 | ............ | H04W 88/02 |
| WO | WO-2024172600 A1 * | 8/2024 | ............... | H04L 5/00 |

OTHER PUBLICATIONS

Notice of Reasons for Refusal for JP Appl. No. 2024-556157, dated Jul. 11, 2025 (with English translation, 4 pages).

(Continued)

*Primary Examiner* — Erika A Washington
(74) *Attorney, Agent, or Firm* — Foley & Lardner LLP

(57) ABSTRACT

Presented are systems and methods for carrier phase positioning. A wireless communication device may receive configuration information about a reference signal for positioning from a wireless communication node. The wireless communication device may measure the reference signal for positioning. The wireless communication device may send a report including a measurement result of the reference signal for positioning to a network.

10 Claims, 8 Drawing Sheets

(56) References Cited

OTHER PUBLICATIONS

Ericsson, "Potential positioning enhancements", 3GPP TSG-RAN WG1 Meeting #103-e, R1-2008765, Nov. 13, 2020, e-Meeting (41 pages).

International Search Report and Written Opinion on PCT/CN2023/086716 mailed Jul. 26, 2023 (7 pages).

3rd Generation Partnership Project; Technical Specification Group Radio Access Network; NR; Physical layer procedures for data (Release 17), 3GPP TS 38.214 V17.5.0 (Mar. 2023), 231 pages.

3rd Generation Partnership Project; Technical Specification Group Radio Access Network; Study on expanded and improved NR positioning; (Release 18), 3GPP TR 38.859 V18.0.0 (Dec. 2022), 106 pages.

Intel Corporation et al., "New WID on Expanded and Improved NR Positioning", 3GPP TSG RAN Meeting #98-e, RP-223549, Dec. 16, 2022, Electronic Meeting (7 pages).

MCC Support, "Draft Report of 3GPP TSG RAN WG1 #112 v0.4.0 (Athens, Greece, Feb. 27-Mar. 3, 2023)", 3GPP TSG RAN WG1 Meeting #112bis-e, R1-230xxxx, Apr. 26, 2023, Online (175 pages).

Moderator (Ericsson), "Feature Lead Summary #4 for Positioning for RedCap UEs", 3GPP TSG-RAN WG1 Meeting #112, R1-2302210, Mar. 3, 2023, Athens, Greece (48 pages).

Zte, "Discussion on Positioning for RedCap UEs", 3GPP TSG RAN WG1 #112, R1-2300808, Mar. 3, 2023, Athens, Greece (11 pages).

Huawei et al., "Discussion on frequency hopping for RedCap positioning", 3GPP TSG-RAN WG1 Meeting #112, R1-2300083, Mar. 3, 2023, Athens, Greece (7 pages).

Office Action for KR Appl. No. 10-2024-7031377, dated Nov. 21, 2025 (with English translation, 9 pages).

Partial Supplementary European Search Report for EP Appl. No. 23922144.3, dated Dec. 4, 2025 (20 pages).

\* cited by examiner

800

Wireless Communication Device/
Wireless Communication Node

805    Receive configuration information
       about a reference signal for
       positioning 810    Measure the reference signal for
       positioning 815    Send a report including a
       measurement result of the
       reference signal for positioning

SYSTEMS AND METHODS FOR POSITIONING

CROSS-REFERENCE TO RELATED APPLICATION

This application claims the benefit of priority under 35 U.S.C. § 120 as a continuation of PCT Patent Application No. PCT/CN2023/086716, filed on Apr. 6, 2023, the disclosure of which is incorporated herein by reference in its entirety.

TECHNICAL FIELD

The disclosure relates generally to wireless communications, including but not limited to systems and methods for positioning.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium of the following. A wireless communication device (e.g., a UE) may receive configuration information about a reference signal for positioning (e.g., a positioning reference signal (PRS)) from a wireless communication node. The wireless communication device may measure the reference signal for positioning. The wireless communication device may send a report including a measurement result of the reference signal for positioning to a network. The configuration information may indicate that when the wireless communication device reports its capability on a phase error group (PEG), the wireless communication device can be configured to report a corresponding phase error of the PEG.

In some embodiments, the configuration information may indicate that when the wireless communication device reports a carrier phase (CP) measurement result with a PEG, the wireless communication device can be configured to report a phase error of the PEG. The configuration information may indicate that when the wireless communication device reports a carrier phase (CP) measurement result with a PEG, the wireless communication device can be configured to report a phase error of the PEG and where in the PEG the phase error is estimated. The configuration information may indicate that, for signals on two adjacent symbols with different resource element (RE) offsets, sub-carriers within one or more resource blocks (RBs) can be overlapped.

In some embodiments, the wireless communication device can be configured to report a carrier phase (CP) on a nearest sub-carrier with a sub-carrier ID when there is no frequency center sub-carrier or direct current (DC) sub-carrier. When performing the measuring step, the wireless communication device may assume that a reference point of a CP measurement is an antenna connector of the wireless communication device. When performing the measuring step, the wireless communication device can be configured to deduce a CP value by assuming that a reference point of a CP measurement is an antenna phase center. When performing the measuring step, in response to identifying that a reference point of a CP measurement is an antenna phase center, the wireless communication device can be configured to deduce a CP value by assuming that the reference point of the CP measurement is an antenna connector of the wireless communication device. When performing the measuring step, in response to identifying that a reference point of a CP measurement is an antenna connector of the wireless communication device, the wireless communication device can be configured to deduce a CP value by assuming that the reference point of the CP measurement is an antenna phase center.

In some embodiments, a DC location index for a CP measurement on the reference signal can be configured by the network. The configuration information may indicate that the wireless communication device can be configured with a reference signal resource characterized with a comb size, a comb offset, and a number of repetitions within a slot. The configuration information may indicate that the wireless communication device can be configured with a number of repetitions of a reference signal resource and a start symbol index of a first one of the repetitions. The configuration information may indicate that the wireless communication device can be configured with a number of repetitions of slots of a reference signal resource having different comb offsets. The configuration information may indicate that the wireless communication device can be configured with a comb size one (e.g., comb size being one; CombSize=1; all the sub-carriers within a symbol are allocated to the PRS) with repetitions within a slot.

In some embodiments, when performing the measuring step, the wireless communication device can be configured to measure one or more hops or a conjunction of one or more hops of the reference signal. The report may further include an indication of combination of one or more hops associated with the measurement result. The report may further include an indication of frequency related information associated with the measurement result. The report may further include an indication of resource related information associated with the measurement result. The report may further include a measurement result on a conjunction of multiple segments of a reference signal resource. The report may further include a measurement result on a conjunction of multiple bandwidths of a reference signal resource. The wireless communication device can be requested to report a measurement result on which conjunction of one or more hops. The wireless communication device can be requested to report a measurement result on an indicated frequency. The wireless communication device can be requested to report a measurement result on indicated bandwidths.

In some embodiments, in response to identifying a collision between a SRS transmission and a physical downlink shared channel (PDSCH), a physical downlink control channel (PDCCH), or other downlink signal/channel, the wireless communication device can be allowed to drop one or more hops of the SRS transmission. The SRS transmission can be with hopping of a half-duplexing of frequency divided duplexing (HD-FDD) UE.

In response to identifying a collision between an SRS transmission and a physical downlink shared channel (PDSCH), a physical downlink control channel (PDCCH), or other downlink signal/channel, the wireless communication device can be allowed to continue the SRS transmission even if a corresponding SRS has a lower priority. The SRS transmission can be with hopping of a half-duplexing of frequency divided duplexing (HD-FDD) UE. If one hop of receiving the reference signal is outside of PPW/MG, the wireless communication device can be allowed to continue receiving one or more other hops of the reference signal. One or more reserved bits in downlink control information (DCI) received by the wireless communication device can be configured to trigger concurrent SRS transmissions for multiple carriers. A combination of bits in one or more fields in DCI received by the wireless communication device may indicate concurrent SRS transmission on multiple carriers.

In some embodiments, one or more reserved bits in DCI received by the wireless communication device can be configured to trigger concurrent receptions for the reference signal on multiple positioning frequency layers.

In some embodiments, a combination of bits in one or more fields in DCI received by the wireless communication device may indicate concurrent receptions for the reference signal on multiple positioning frequency layers. The wireless communication device, as a RedCap UE, can be allowed to request a number of hops of a PRS transmission. On-demand PRS transmission procedure may allow the LMF to control and decide whether PRS is transmitted or nor and to change the characteristics of an ongoing PRS transmission. The on-demand PRS transmission procedure can be initiated by the UE or LMF. The actual PRS changes can be requested by the LMF irrespective of whether the procedure is UE- or LMF-initiated.

In some embodiments, the wireless communication device, as a RedCap UE, can be allowed to request an intra-slot repetition factor of the reference signal. The wireless communication device, as a RedCap UE, can be allowed to request a frequency information of the reference signal.

In some embodiments, a wireless communication node may receive configuration information about a reference signal for positioning from a wireless communication device. The wireless communication node may measure the reference signal for positioning. The wireless communication node may send a report including a measurement result of the reference signal for positioning to a network. The configuration information may indicate that when the wireless communication node reports a CP measurement result, the wireless communication node can be configured to report a phase error of a MIMO SRS port. The configuration information may indicate that when the wireless communication node reports a CP measurement result, the wireless communication node can be configured to report a phase error of a MIMO SRS port with a port ID. The configuration information may indicate that when the wireless communication node reports a CP measurement result, the wireless communication node can be configured to report a phase error of a MIMO SRS port with a hopping ID. The configuration information may indicate that when the wireless communication node reports a CP measurement result, the wireless communication node can be configured to report a phase error of a MIMO SRS port with a PEG ID. The configuration information may indicate that when the wireless communication node reports a CP measurement result, the wireless communication node can be configured to report a phase error of a MIMO SRS port with a SRS resource ID. The configuration information may indicate that when the wireless communication node reports a CP measurement result, the wireless communication node can be configured to report SRS related configuration information. The SRS related configuration information may include at least one of: a band, a carrier index, an absolute radio frequency channel number (ARFCN), a carrier center frequency, a carrier center frequency of a hop, a start frequency of a hop, an end frequency of a hop, a bandwidth of this carrier, a bandwidth of a hop being measured, a hopping ID.

In some embodiments, within a SRS measurement window, the wireless communication node can be configured to process SRS reception only while the wireless communication node drops all other signal(s) or channel(s). Within a SRS processing window, upon identifying that a time gap between a SRS transmission and a PUSCH/PUCCH/PRACH transmission is less than a duration, the wireless communication node can be configured to continue processing the SRS transmission and drop other signal(s) or channel(s) even if a corresponding SRS has a lower priority. The wireless communication node can requested by the network to measure a CP with a PEG within a TEG when the wireless communication node performs a timing related measurement. The configuration information may indicate that a symbol with index {{S, S+1, . . . , S+L−1}+i*L} can be allocated to a PRS, where, i is an integer of {0, 1, 2, . . . , R−1}, R is a number of repetitions within a slot, L is a number of symbols of the PRS, and S is a start symbol index. In some embodiments, the measurement may include: when a TRP measures a relative time of arrival (RTOA), a RTOA reference time may include a nominal beginning time of system frame number 0 provided by a system frame number initialization time of a first hop. The measurement may include: a TRP can be requested with a PRS transmission with a positioning frequency layer (PFL) aggregation.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
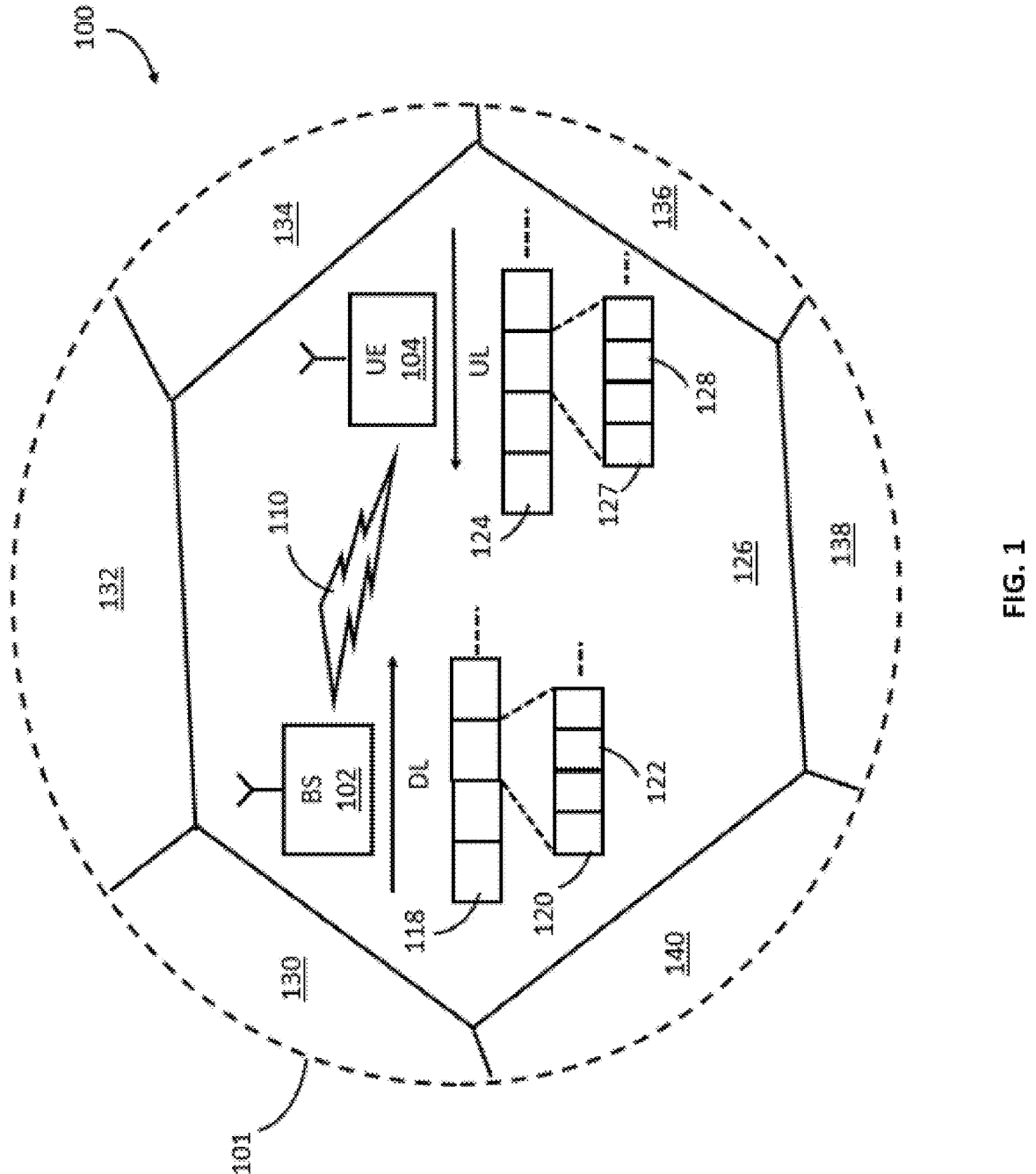
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
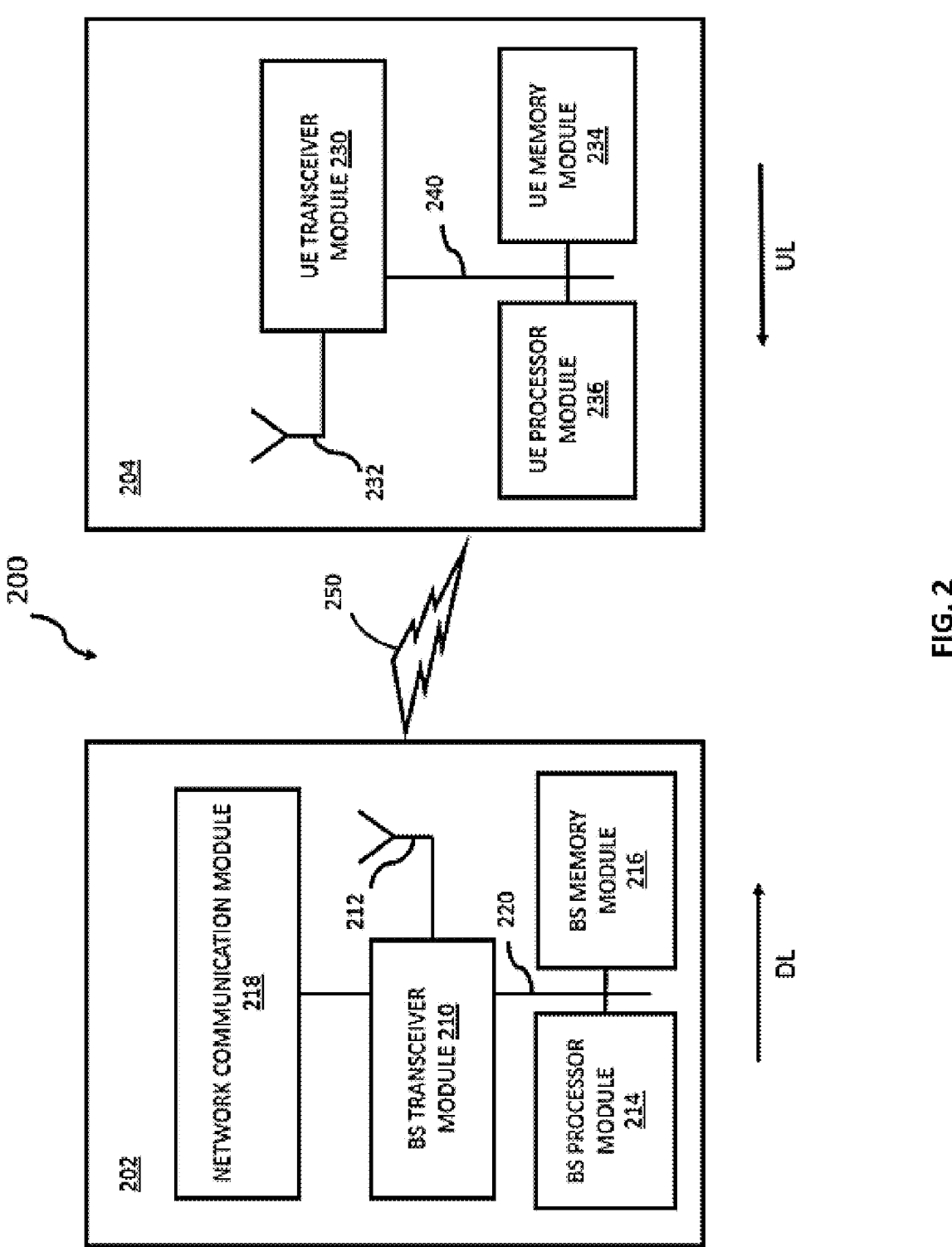
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Positioning

A demand for positioning is rising up. For example, in a park (especially, an underground park), it may not be easy to find a car (especially, during busy hour). The 5th generation mobile communication system (e.g., 5G, new radio access technology, or 5G-NR) may provide a method for positioning (e.g., positioning reference signal (PRS, from a base station (e.g., gNB)) and/or sounding reference signal (SRS, from a user equipment (UE)) on a radio side. However, a positioning accuracy of the existing 5G-NR-based positioning solutions may not be high enough (e.g., one meter or worse). In some harsh environments (e.g., dense urban area), the positioning accuracy of the existing 5G-NR-based positioning solution can be even worse. In some commerce cases, a positioning accuracy of 0.2 meter can be required. In some cases, a target of some commerce cases (e.g., 0.2 meter) can be hard to be achieved by the existing 5G-NRbased positioning solution. This disclosure is related to positioning accuracy improvement for 5G-NR-based positioning.

Figure 3:
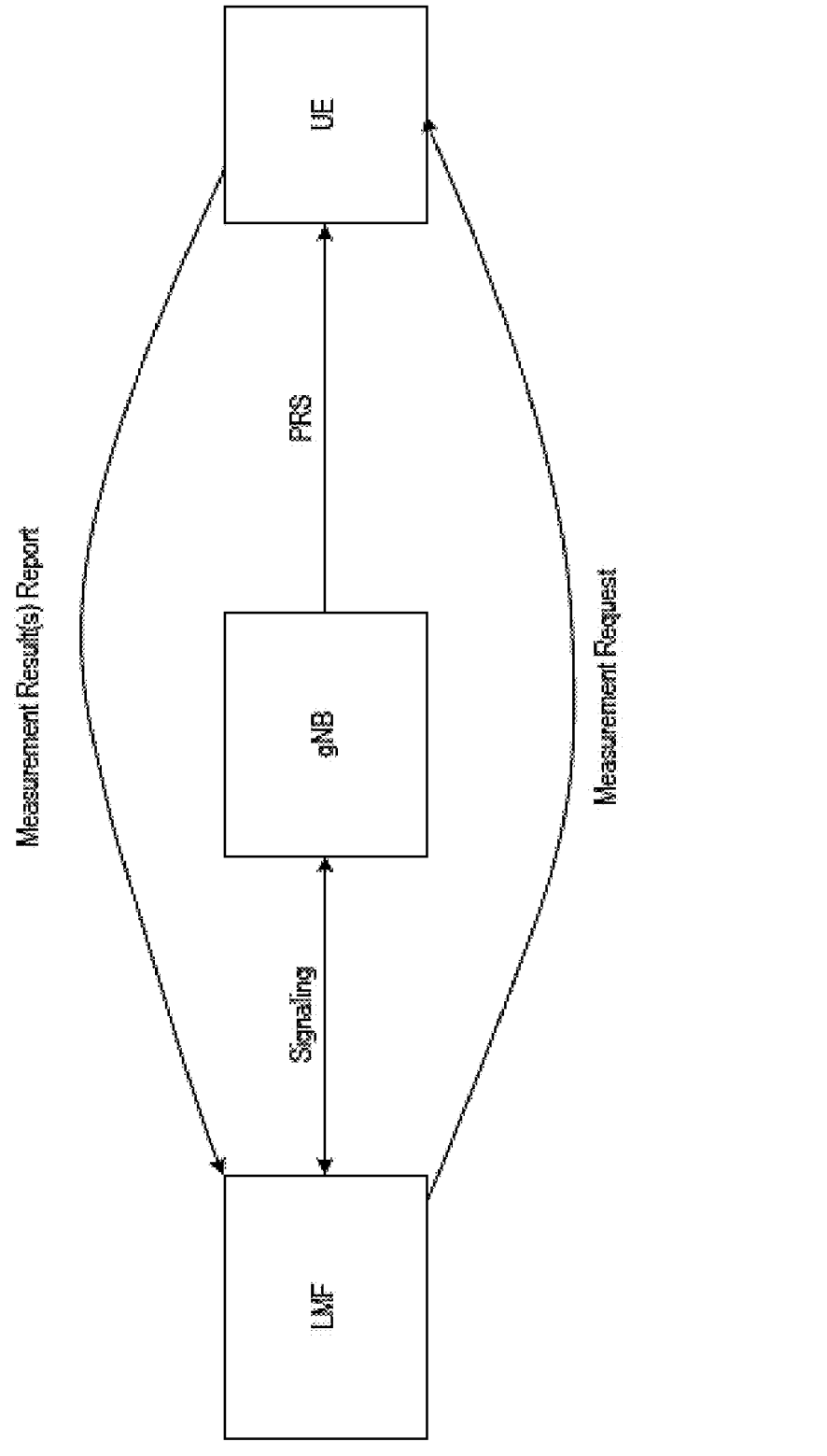
FIG. 3 illustrates an example implementation of positioning, in accordance with some embodiments of the present disclosure.

This disclosure relates to a radio communication about how to improve positioning accuracy for a 5G-NR-based positioning. In a downlink (DL) as shown in FIG. 3, a positioning reference signal (PRS) can be transmitted by one or multiple gNBs. In order to achieve a "good" positioning accuracy, multiple gNBs can be involved (e.g., three base stations). A UE may measure at least one PRS. The UE may report measurement result(s) to a network (e.g., a Location Management Function (LMF) in a core network (CN) or a 5G CN (5GC)). A network element may include at least one of: a gNB, a CN, or a UE.

Figure 4:
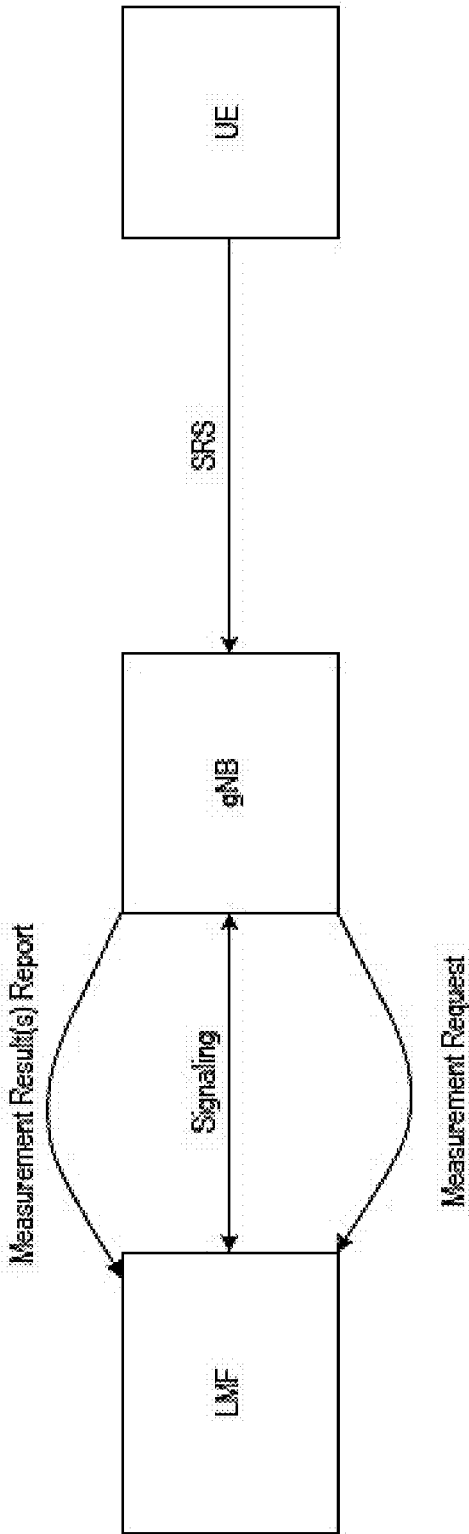
FIG. 4 illustrates an example implementation of positioning, in accordance with some embodiments of the present disclosure.

In an uplink (UL) as shown in FIG. 4, a sounding reference signal (SRS) can be transmitted by a UE. One or more gNBs (e.g., multiple gNBs) may measure the SRS. The one or more gNBs may report measurement result(s) to a network (e.g., a LMF).

A transmission of PRS and/or SRS for purpose of positioning can be easily affected by a radio propagation environment (e.g., fading, distortion). Hence, the positioning accuracy can be limited. This disclosure can provide a method for higher positioning accuracy.

Figure 5:
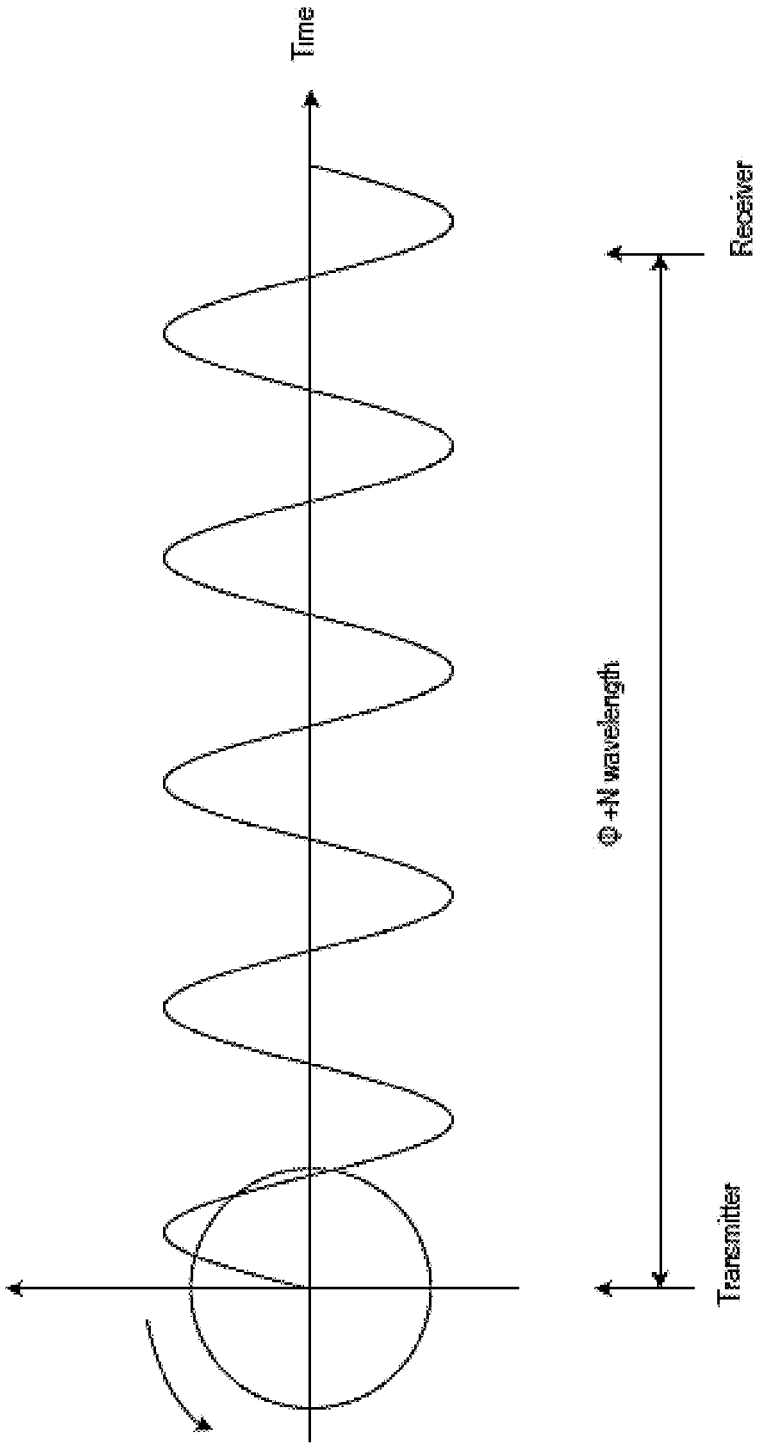
FIG. 5 illustrates an example implementation of a radio wave with multiple wavelengths, in accordance with some embodiments of the present disclosure.

In FIG. 5, a radio wave may travel from a transmitter to a receiver with multiple wavelengths. For a full wavelength, a corresponding carrier phase (or, carrier phase difference between the transmitter and the receiver) can be $2\pi$ (equivalently, zero phase). For a fraction part of a wavelength, the corresponding carrier phase can be a value within $(0, 2\pi)$. If the carrier phase can be measured (and without noise interference, and an assumption of line of sight (LOS) between the transmitter and the receiver), the distance between the transmitter and the receiver (D) can be $D=(\Phi+N)\cdot\lambda=(\Phi+N)\cdot c/f$. $\Phi$ can be the fraction part of the measured carrier phase (in unit of $2\pi$, in a range of 0~1.0). N can be the integer part of the measured carrier phase. $\lambda$ can be the wavelength of the radio wave transmitted by the transmitter. c can be the velocity of light. f can be the carrier frequency of the radio wave transmitted by the transmitter.

In some embodiments, if a UE can measure the carrier phase (e.g., $\Phi$, N, or $\Phi+N$, where the N can be searched with a specific algorithm), the distance between the transmitter and the receiver can be determined. In certain embodiments, the carrier phase can be only referred to the fraction part ($\Phi$) because the integer N may not be "measured" directly (e.g., it can be guessed, with least error).

Implementation Example 1: Phase Error Group (PEG) of Carrier Phase Positioning (CPP)

In a carrier phase positioning (CPP), a measured carrier phase (CP) value may be different from a true CP value. That is, there can be an (carrier) phase error of CP measurement. If the (carrier) phase error is within a margin (e.g., 0.1%), the CP measurement can be very reliable.

A UE (or a gNB, or a transmission and reception point (TRP)) may be equipped with multiple antennas (including transmission antenna, and/or reception antenna). One antenna may have different phase error from another. One or more antennas within a phase error margin can be grouped into a phase error group (PEG, including transmission PEG (Tx PEG), reception PEG (Rx PEG), reception and transmission PEG (Rx-Tx PEG)).

All the antenna(s) within a PEG may have phase coherency (or phase consistency). For example, the CP measured by the antenna(s) within a PEG may have coherent phase (e.g., these CP is inner related to some extent). Alternatively, one or more antennas with phase coherency can be grouped into a PEG. Alternatively, a frequency error of antenna(s) in a PEG can be within a margin (e.g., 0.01 PPM). Alternatively, a timing error of antenna(s) in a PEG can be within a margin (e.g., 0.1 ns). Alternatively, a frequency error of a PEG can be within a margin. Alternatively, a timing error of a PEG can be within a margin.

When a UE reports its capability on PEG (or capability on CPP, or capability on CP, or capability on CP measurement), the UE may report the phase error (or phase error margin) of a PEG (e.g., Rx PEG). Alternatively, when a UE reports its capability on PEG (or CP), the UE may report the phase error (or, phase error margin) of antenna(s) of a PEG.

When a UE reports its capability on PEG (or capability on CPP, or capability on CP, or capability on CP measurement), the UE may report the distribution of phase error (or phase error margin) of a PEG. Alternatively, when a UE reports its capability on PEG (or CP), the UE may report the distribution of phase error (or phase error margin) of antenna(s) of a PEG.

When a UE reports its capability on PEG (or capability on CPP, or capability on CP, or capability on CP measurement), the UE may report the consistency of phase error (or phase error margin) of a PEG. Alternatively, when a UE reports its capability on PEG (or CP), the UE may report the consistency of phase error (or, phase error margin) of antenna(s) of a PEG.

When a UE reports CP measurement result(s) with a PEG, the UE may report the phase error (or phase error margin) of this PEG. Alternatively, when a UE reports CP measurement result(s) with a PEG, the UE may report the phase error (or phase error margin, or phase error margin value) of antenna(s) of this PEG.

When a UE reports CP measurement result(s) with a PEG, the UE may report the phase error (or phase error margin) of this PEG where the phase error (or phase error margin) is estimated by the UE. Alternatively, when a UE reports CP measurement result(s) with a PEG, the UE report the timing error (or timing error margin) of the PEG. Alternatively, when a UE reports CP measurement result(s) with a PEG, the UE may report the timing error (or timing error margin) of antenna(s) of this PEG.

When a UE reports CP measurement result(s) with a PEG, the UE may report the phase error (or, phase error margin) with a PEG ID of the PEG. When a UE reports CP measurement result(s) with a PEG, the UE may report the phase difference of this PEG. A LMF can request a UE (or gNB, or TRP) for reporting phase error (or phase error margin) of PEG (e.g., a Tx PEG, or a Rx PEG). A LMF can request a UE (or gNB, or TRP) for reporting phase error (or phase error margin) of antenna(s) of the PEG.

A positioning reference unit (PRU, similar to a UE with known/fixed location) can transmit SRS. After that, a TRP (or gNB) can measure the phase error of Tx PEG of the PRU by CP measurement on this SRS, if the receiving phase of this TRP (or gNB) were calibrated. Alternatively, a LMF can compute the phase error of Rx PEG of the TRP (or gNB) with the CP measurement from the TRP (or gNB). After that, the LMF can forward the phase error of Rx PEG of the TRP (or gNB) to the TRP (or gNB). Alternatively, if the location of a PRU were known to a TRP (or gNB), the TRP (or gNB) can compute receiving phase error of a Rx PEG (of a TRP, or a gNB), if the transmission phase error of PRU were calibrated. Alternatively, a CP measurement (or phase error) measured by a hardware (e.g., a phase lock loop, PLL) can be reported. Alternatively, a CP measurement (or phase error) measured by a panel (or antenna panel, or different panels) can be reported.

To support phase continuity between (signals on) two (adjacent) symbols (or two positioning reference signal resources with different resource element offset or comb offset), some resource elements (RE) or sub-carriers within some resource block(s) (RB) can be overlapped in frequency (or with the same sub-carrier, or with the same sub-carrier index). Alternatively, muting on this/these RB/RE/sub-carrier between gNB (or TRP) can be applied.

During a UE (or gNB, or TRP) capability report, a UE (or gNB, or TRP) can report its PEG (including Tx, Rx, Rx-Tx PEG) related information. Alternatively, the PEG related information includes number of PEG, configuration of PEG (e.g., number of antennas), phase error with a granularity (e.g., 0.1 degree, or 0.01 of 2×, or 0.001 Rad), phase error margin with a granularity (e.g., 0.1 degree, or 0.01 of 2×, or 0.001 Rad). Alternatively, a UE can report multiple CP measurements (or differential CP measurements, e.g., 8 measurements) associated with different DL PRS resources per UE Rx PEG per TRP (with PRS ID). Alternatively, a UE can measure/report CP measurement (or differential CP measurement) on a PRS resource associated with a TRP (with PRS ID) using multiple different UE Rx PEG (e.g., 8 Rx PEG) with the same PRS reference information. Alternatively, when a UE reports CP measurements with PEG (or PEG ID), the UE can report the relationship with a timing error group (TEG). For example, PEG 1 can be mapped onto TEG 2 in a CP measurements. Alternatively, a PEG can be a sub-set of TEG (e.g., a TEG has two PEG). Alternatively, the number of PEG (e.g., 2 PEG) can be less than or equal to the number of TEG (e.g., 4 TEG). Alternatively, the antenna(s) in a PEG (e.g., antenna #1, antenna #2) can be a sub-set of the antenna(s) in TEG (e.g., antenna #1, antenna #2, antenna #3, antenna #4). Alternatively, the antenna port(s) in a PEG (e.g., port #0, port #1) can be a sub-set of the antenna port(s) in TEG (e.g., port #0, port #1, port #2, port #3). Alternatively, a UE (or gNB, or TRP) can be request by a network (e.g., LMF) to measure CP with a PEG within a TEG. Alternatively, a UE (or gNB, or TRP) can be request by a network to measure CP with a PEG within a TEG when the UE (or gNB, or TRP) performs a timing related measurement (e.g., time difference of arrival (TDOA), reference signal time difference (RSTD)). Alternatively, a TEG can be a sub-set of PEG. Alternatively, the number of TEG (e.g., 2 TEG) can be less than or equal to the number of PEG (e.g., 4 PEG). Alternatively, the antenna(s) in a TEG (e.g., antenna #1, antenna #2) can be a sub-set of the antenna(s) in PEG (e.g., antenna #1, antenna #2, antenna #3, antenna #4). Alternatively, the antenna port(s) in a TEG (e.g., port #0, port #1) can be a sub-set of the antenna port(s) in PEG (e.g., port #0, port #1, port #2, port #3).

Figure 6:
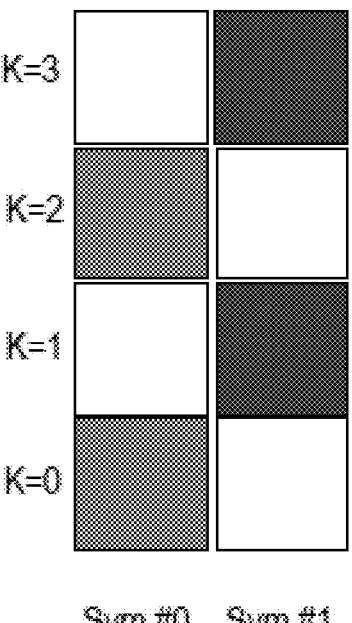
FIG. 6 illustrates an example implementation of positioning, in accordance with some embodiments of the present disclosure.

For some PRS/SRS resource as in FIG. 6, there may be no frequency center sub-carrier or direct current (DC) sub-carrier (e.g., no k=0 sub-carrier, as the resource on symbol #1 with black block ■). Under this circumstance, a UE can measure/report CP on a nearest sub-carrier with sub-carrier ID. Alternatively, if the PRS/SRS were not configured on the k=0 sub-carrier, a UE can measure/report CP on a nearest sub-carrier with sub-carrier ID. Alternatively, a UE may measure CP on a k/0 sub-carrier and may deduce/report the CP value on the k=0 sub-carrier. Alternatively, on a symbol ID=0, 1, 2, . . . , CombSize−1, a UE may measure/report CP on a sub-carrier with sub-carrier index being symbol ID. Alternatively, a LMF may configure which sub-carrier(s) can be measured/reported. Alternatively, the reference point of CP measurement can be the antenna connector of UE (or TRP). Alternatively, a UE (or TRP) may deduce the CP value by assuming that the reference point of CP measurement is antenna phase center (e.g., according to distance difference between antenna connector and antenna phase center). Alternatively, when the reference point of CP measurement is the antenna connector of UE (or TRP), a UE (or TRP) may deduce the CP value by assuming that the reference point of CP measurement is antenna phase center of UE (or TRP). Alternatively, when the reference point of CP measurement is antenna phase center, a UE (or TRP) may deduce the CP value by assuming that the reference point of CP measurement is the antenna connector of UE (or TRP). Alternatively, the reference point of CP measurement can be configured by a network (e.g., LMF). Alternatively, when a UE (or gNB, or TRP) measures CP, the reference point of CP measurement can be identical to that of timing based positioning (e.g., time difference of arrival (TDOA), reference signal time difference (RSTD), or the antenna connector of UE, gNB, or TRP). Alternatively, the phase error can be signaled by a network (e.g., LMF) to UE (or TRP). Alternatively, a network (e.g., LMF) can configure whether an original CP value or a differential CP value is reported. Alternatively, for reference TRP/reference PRS resource/reference (sub-) carrier/reference segment, an original CP value can be reported. Alternatively, for non-reference TRP/non-reference PRS resource/non-reference (sub-) carrier/non-reference segment, a differential CP value (relative to reference TRP) can be reported. Alternatively, there can be a phase continuity indicator when UE reporting CP measurement. For example, in slot #1 and #2, a UE may measure CP two times and may find a phase discontinuity, then the UE may report CP with phase continuity indicator (e.g., one bit "1" for this case).

For sidelink positioning, the DC location (or DC sub-carrier) index for CP measurement on sidelink PRS can be configured by a network (e.g., a gNB/TRP/LMF) or another UE. Alternatively, the last RB of a sidelink resource pool for positioning can be occupied by sidelink PRS. Alternatively, a flex symbol (F) on a downlink/uplink can be occupied by sidelink PRS. Alternatively, for sidelink positioning, for a specific Comb size (e.g., 4), only Comb/2 (e.g., 4/2=2) UE can be multiplexing on a symbol (or a resource). It can avoid inter-sub-carrier interference. Alternatively, for sidelink positioning, a node ID (or UE ID, e.g., 16 bits) is with a gNB ID (or TRP ID, e.g., 10 bits). The ID can be used to generate a sequence for sidelink PRS. Alternatively, for sidelink positioning, for sidelink resource allocation scheme 2 (e.g., resource allocation by a UE), if both random resource selection and sensing-based resource allocation were configured, the sensing-based resource allocation can be selected first. Alternatively, the code domain power of sidelink PRS can be measured for sensing-based resource allocation where the reference point of sensing is the antenna connector of UE.

With this method, a location computation end (e.g., LMF) can choose appropriate antenna/PEG for CP measurement/report. Hence, the phase error can be minimum and, the performance of positioning can be improved.

Implementation Example 2: UL Positioning with
Multiple Input Multiple Output (MIMO) Sounding
Reference Signal (SRS), for Carrier Phase
Positioning (CPP)

A UE (or a gNB, or TRP) may be equipped with multiple antennas (including transmission antenna, reception antenna). These antennas can form a multiple input multiple output (MIMO) system. A UE can transmit a SRS with MIMO scheme (e.g., MIMO SRS).

A channel/signal (e.g., SRS) transmission with MIMO can have a port (or antenna port, with a port ID, e.g., port ID 6000) where the channel/signal can be transmitted with beamforming. A MIMO port can have one or more antennas. Different MIMO SRS port may have different (carrier) phase error (or phase error margin). When a gNB (or TRP) measures/reports CP measurement results, the gNB may measure/report phase error (or phase error margin) of a MIMO SRS port. When a gNB (or TRP) measures/reports CP measurement results, the gNB may measure/report phase error (or phase error margin) of a MIMO SRS resource port. Alternatively, when a gNB (or TRP) measures/reports CP measurement results, the gNB may measure/report phase error (or phase error margin) of a MIMO SRS port which is applied by a UE for MIMO SRS transmission. Alternatively, when a gNB (or TRP) measures/reports CP measurement results, the gNB (or TRP) may measure/report phase error (or phase error margin) of a MIMO SRS port with port ID. Alternatively, when a gNB (or TRP) measures/reports CP measurement results, the gNB (or TRP) may measure/report phase error (or phase error margin) of a MIMO SRS port with SRS resource (set) ID. Alternatively, when a gNB (or TRP) measures/reports CP measurement results, the gNB (or TRP) may measure/report phase error (or phase error margin) of a MIMO SRS port with hopping ID (HopID, if the SRS is transmitted with frequency hopping). Alternatively, when a gNB (or TRP) measures/reports CP measurement results, the gNB (or TRP) may measure/report phase error (or phase error margin) of a MIMO SRS port with PEG ID (including Tx PEG ID, Rx PEG ID, Rx-Tx PEG ID). Alternatively, when a gNB (or TRP) measures/reports CP measurement results, the gNB (or TRP) may measure/report phase error (or phase error margin) of a MIMO SRS port with SRS resource (set) ID. Alternatively, a SRS resource can be mapped onto one MIMO SRS port. Alternatively, a SRS resource in a SRS resource set can be mapped onto one MIMO SRS port.

For a MIMO SRS transmission with hopping, the carrier center frequency of a hop (or a transmission with hopping) may be different from the carrier center frequency of a carrier of SRS (or SRS resource). Hence, when a gNB (or TRP) reports CP measurement on MIMO SRS (resource), the gNB (or TRP) may report SRS related (configuration) information. Alternatively, the SRS related (configuration) information may include at least one of: band, carrier index, absolute radio frequency channel number (ARFCN), carrier center frequency, carrier center frequency of a hop, start frequency (of a hop/this hop), end frequency (of a hop/this hop), bandwidth of this carrier, bandwidth of this hop (being measured), hopping ID (or HopID).

With this method, a location computation end (e.g., LMF) can choose appropriate antenna/MIMO SRS port for CP measurement/report. Hence, the phase error can be minimum and the performance of positioning can be improved.

Implementation Example 3: Intra-Slot Rx Hopping of PRS for Reduced Capability (RedCap) UE For a reduced capability (RedCap) UE, the UE can only transmit/receive a limited bandwidth (e.g., only 20 MHz in frequency range 1, FR 1). There may be no limitation on a gNB (or TRP) where a gNB (or TRP) can transmit a large bandwidth (e.g., 100 MHz for a carrier in FR 1).

Figure 7:
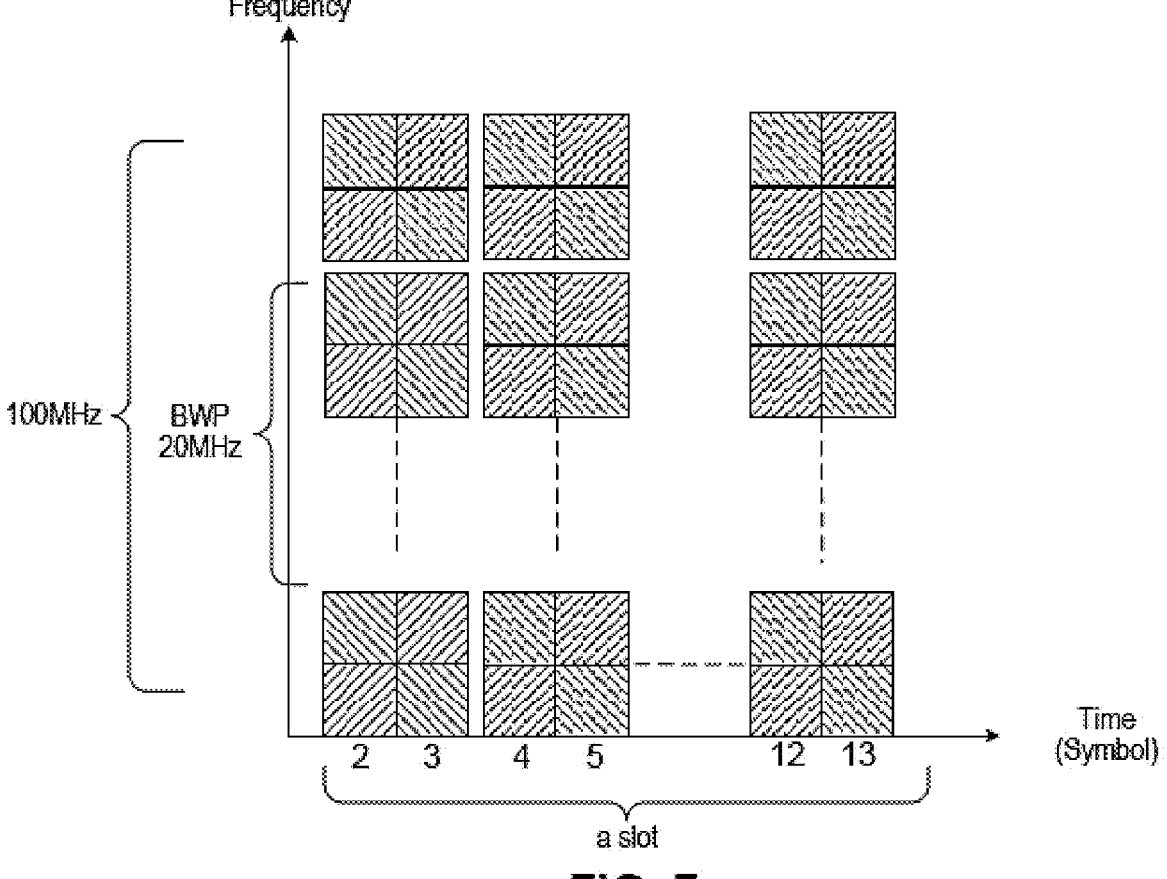
FIG. 7 illustrates an example implementation of positioning, in accordance with some embodiments of the present disclosure.

A UE can be configured with a PRS resource with repetition within a slot. Alternatively, a UE can be configured with a PRS resource with Comb size, Comb offset (RE offset, in a symbol), and number of repetitions within a slot. For example, the PRS resource can be with Comb size 2 and 6 repetitions within a slot ($2\times6=12$ symbols in total, symbol #2-#13, intra-slot repetition) as in FIG. 7.

Alternatively, if the number of symbols of PRS (resource) is L, the start symbol index can be S and the number of repetitions within a slot (note: a repetition is with L symbols) can be R. A symbol with index $\{\{S, S+1, \ldots, S+L-1\}+i*L\}$ can be allocated to PRS. The i can be an integer of $\{0, 1, 2, \ldots, R-1\}$. Alternatively, a symbol with index $\{S+i*L, S+i*L+1, \ldots, S+i*L+L-1\}$ can be allocated to PRS. For example, if S=2, L=2, R=6, a symbol with index $\{\{2,3\}, \{4,5\}, \{6,7\}, \{8,9\}, \{10,11\}, \{12,13\}\}$ can be allocated to PRS (e.g., symbol #2-13). Alternatively, the number of repetitions R can be within a combination of multiple slots. For example, if there are 12 symbols in a slot, there can be 24 symbols in a combination of two slots. If S=2, L=4, R=4, a symbol with index $\{\{2,3, 4,5\}, \{6,7, 8,9\}, \{10,11, 12,13\}, \{14, 15, 16, 17\}\}$ can be allocated to PRS (note: $\{14, 15, 16, 17\}$ can be on the second slot. The actual symbol ID can be $\{14, 15, 16, 17\}$-14+S=$\{2, 3, 4, 5\}$, where the "14" can be a number of symbols within a slot). Alternatively, for this case, a PRS (resource) may start at an even slot (e.g., a modular of 2 of slot ID can be 0). Alternatively, in frequency, this PRS resource can be configured outside of bandwidth part (BWP) of this UE as FIG. 7.

In this example, a Comb offset 0 (i.e., RE offset 0) on symbol #2, 4, 6, 8, 10 can be assigned to a UE while the symbol #3, 5, 7, 11 are served as guard symbol (or gap, or radio frequency, RF re-tuning time) for a UE. It should be noted that, the symbol #3, 5, 7, 11 can be assigned to another UE while the symbol #2, 4, 6, 8, 10 are served as guard symbol. In addition, a repetition offset (from 0 to number of repetitions minus one) can be indicated to a UE.

In this example, a gNB (or TRP) can transmit a full large bandwidth (e.g., 100 MHz) in every repetition of PRS but a UE only receive a sub-set of repetition of PRS (e.g., symbol #2, 4, 6, 8, 10) with different frequency part of a repetition (e.g., 20 MHz each, with overlapped RB between two adjacent repetitions or two adjacent hops). In this example, only one repetition (or transmission, or hop) of PRS can be within UE's BWP while the others are outside of its BWP. Alternatively, a UE can be configured the number of repetitions of PRS resource and the start symbol index of the first repetition (or the first transmission). Alternatively, a UE can be configured with the number of repetitions of slots (e.g., equal to the Comb size) of PRS resource. Alternatively, a UE can be configured with the number of repetitions of slots (e.g., equal to the Comb size) of PRS resource with different Comb offset (or RE offset, or symbol offset, e.g., RE offset plus slot index, then the modular value of number of repetitions of slots is used). Alternatively, a UE can be configured with Comb size one (e.g., all the RE/sub-carriers within a symbol are occupied) with repetition within a slot (i.e., intra-slot repetition). The number of repetitions can be configured (e.g., 12 repetitions, from symbol #2-#13). Alternatively, a UE can be configured with Comb size 12 with one symbol (e.g., one RE/sub-carriers within a RB is occupied) with RE offset and repetition within a slot (e.g., intra-slot repetition, such as 12 repetitions). At the same time, a UE can be configured with the number of repetitions of slots (e.g., 4 slot repetitions). Alternatively, the RE offset for each repetition can be not configured but can be deduced from symbol index and number of repetitions for all the repetitions of intra-slot repetition and inter-slot repetition. For example, if the intra-slot repetition (M) were 12 and inter-slot repetition (P) were zero, PRS may start from symbol ID 2, available number of symbols for PRS (W=12), then the RE offset can be (M+W*P−SymbolID) mod CombSize= (12+12*0−2) mod 12=10. Alternatively, the RE offset can be fixed with some value (e.g., 0) which is helpful for CP measurement.

In some embodiments, for each repetition with different RE offset among them, some sub-carriers can be received again between adjacent reception (e.g., with overlapped sub-carriers in each reception). Alternatively, a UE may report its capability on switching time between hops. Alternatively, if UE supported a short switching time (e.g., one symbol, two symbols), an intra-slot frequency hopping and small Comb size can be configured (e.g., Comb=2) with repetition (e.g., 5, 6, 20, 24, 25, 26, 27 repetitions). Alternatively, a UE may report its capability on PRS data buffering. For example, a UE can report that it can buffer 100 MHz data of PRS. Alternatively, this capability on PRS data buffering can be related to data channel processing. For example, if this UE supported 8 hybrid automatic repeat request (HARQ) processes which each HARQ process can have 20 MHz data of data channel, the UE can process 8*20 MHz=160 MHz data of PRS.

Alternatively, when a gNB (or TRP) measures relative time of arrival (RTOA) of SRS from a UE, the UL RTOA reference time may include $T_0$. $T_0$ can be a nominal beginning time of SFN 0 provided by a system frame number (SFN) initialization time of the first hop for a RedCap UE. Alternatively, To can be a nominal beginning time of SFN 0 provided by a system frame number (SFN) initialization time of the last hop for a RedCap UE. Alternatively, To can be a nominal beginning time of SFN 0 provided by a system frame number (SFN) initialization time of the last hop of SRS for a RedCap UE. Alternatively, To can be a nominal beginning time of SFN 0 provided by a system frame number (SFN) initialization time of the last hop of SRS resource for a RedCap UE. Alternatively, To can be a nominal beginning time of SFN 0 provided by a SFN initialization time of the first SRS resource for a RedCap UE. Alternatively, To can be a nominal beginning time of SFN 0 provided by a SFN initialization time of the first SRS resource for hopping of a RedCap UE. Alternatively, To can be a nominal beginning time of SFN 0 provided by a SFN initialization time of the first segment of SRS resource for a RedCap UE. Alternatively, To can be a nominal beginning time of SFN 0 provided by a SFN initialization time of the first segment of SRS resource with hopping for a RedCap UE.

With this method, a RedCap UE can receive part bandwidth (e.g., 20 MHz) of a repetition of PRS (e.g., 100 MHz). After that, this UE can concatenate each reception together to form a large bandwidth. After that, this UE can measure the concatenated PRS. With a larger concatenated bandwidth than a limited bandwidth (20 MHZ), the performance of positioning for RedCap UE can be improved (e.g., the larger the bandwidth is, the higher positioning accuracy will be).

Implementation Example 4: (RedCap UE) Hopping in RRC_INACTIVE

For a RedCap UE, before entering radio resource control (RRC) inactive state (RRC_Inactive) from RRC_Connected state, the UE may have been configured with PRS/SRS hopping related information (e.g., via a RRC release signaling, system information broadcast (SIB)).

Alternatively, the hopping order (or hopping sequence, e.g., which frequency can be performed for hopping, which HoppingID/HopID can be indicated in an order) can be included in the RRC signaling/SIB. Alternatively, the frequency resource related information (e.g., start RB number, e.g., a start RB number can be with mod(#RB, 4)==0, where the mod( ) is modular operation, length of RB, end of RB, RB allocation granularity, e.g., a granularity of 4 RB, number of overlapped RB) can be included in the RRC signaling/SIB. Alternatively, the frequency resource related information for each hop can be included in the RRC signaling/SIB. Alternatively, the time resource related information for each hop (e.g., periodicity, slot, slot offset, and/or repetition) can be included in the RRC signaling/SIB. Alternatively, the PRS/SRS resource (set) related information for each hop can be included in the RRC signaling/SIB. Alternatively, the PRS/SRS power control (or power allocation) related information for each hop can be included in the RRC signaling/SIB. Alternatively, a constant energy per RE (EPRE) for PRS/SRS on each hop can be assigned in the RRC signaling/SIB.

Alternatively, a UE (or gNB, or TRP) may measure one or more hops or a combination of hop(s) or a conjunction of hop(s) of PRS (or SRS). For example, a UE may measure a combination of hop(s) of {{1}, {1,2}, {1,2,3}, {1,2,3,4}, {1,2,3,4,5}}, where the number(s) in brackets can be the hop ID (e.g., two numbers (e.g., {1,2}) for a conjunction of two hops, three numbers (e.g., {1,2,3}) for a conjunction of three hops). Alternatively, a UE (or gNB, or TRP) may report measurement result with an indication of combination of hop(s). For example, a UE may report measurement result of a combination of hop(s) of {{1}, {1,2}, {1,2,3}, {1,2,3,4}, {1,2,3,4,5}}, where {1} may represent that the measurement result is for hop ID #1, {1,2} may represent that the measurement result is for a conjunction of hop ID #1 and #2. Alternatively, a UE (or gNB, or TRP) may report measurement result with an indication of frequency related information (e.g., start of frequency in measurement, end frequency, and/or bandwidth in measurement). Alternatively, a UE (or gNB, or TRP) may report a measurement result with an indication of resource related information (e.g., PRS/SRS resource, PRS/SRS resource set). For example, a UE may report a measurement result on a conjunction of PRS resource 1, PRS resource 2, and PRS resource 3. Alternatively, a UE (or gNB, or TRP) may report a measurement result on a conjunction of multiple segments (or multiple hops) of a PRS/SRS resource (e.g., on a conjunction of segments {1, 2, 3} of a large bandwidth, e.g., 100 MHz). Alternatively, a UE (or gNB, or TRP) may report a measurement result on a conjunction of multiple bandwidths of a PRS/SRS resource (e.g., on a conjunction of bandwidths 20 MHz, 20 MHz, 20 MHz. e.g., equivalent 60 MHz). Alternatively, a location computation end (e.g., a LMF) can request a UE (or gNB, or TRP) to report measurement result(s) on which conjunction of hop(s). For example, a LMF can request a UE to report measurement result on a conjunction of hops {1, 2, 3}.

In some embodiments, a location computation end (e.g., a LMF) can request a UE (or gNB, or TRP) to report measurement result(s) on indicated frequency (e.g., from start frequency to end frequency, e.g., 2000 MHz to 2100 MHz, can be expressed in ARFCN). Alternatively, a location computation end (e.g., a LMF) can request a UE (or gNB, or TRP) to report measurement result(s) on indicated bandwidths (e.g., 20 MHz, 20 MHz, 20 MHZ). Alternatively, a location computation end (e.g., a LMF) can request a UE (or gNB, or TRP) to report measurement result(s) on indicated total bandwidth (e.g., 100 MHz, can be expressed in number of RB at a sub-carrier spacing (SCS)). Alternatively, a location computation end (e.g., a LMF) can request a UE (or gNB, or TRP) to report measurement result(s) on which conjunction of PRS/SRS resource(s) (e.g., on conjunction of SRS resource 1, SRS resource 2, and SRS resource 3).

A RedCap UE can receive/transmit PRS/SRS outside its supported/configured BWP (e.g., outside of 20 MHz of a BWP). For example, for SCS-30 kHz, there can be 51 RB in total but a RedCap UE may receive 52 (or 56) RB of PRS for one hop (for overlapped RB for phase tracking between hops). For another example, a RedCap UE may transmit 52 (or 56) RB of SRS for one hop (for overlapped RB for phase tracking between hops, for gNB/TRP). Alternatively, a PRS/SRS specific BWP can be configured for a UE where only PRS/SRS is contained and there is no other signal/channel. Alternatively, signal in the PRS/SRS specific BWP can be quasi-co-locate (QCL) with synchronization signal block (SSB). Alternatively, the number of the PRS/SRS specific BWP (e.g., 20 BWP, 32 BWP) can be configured by a network (e.g., LMF). Alternatively, there can be multiple activated PRS/SRS specific BWP (e.g., 5 active BWP). Alternatively, the switching order of the PRS/SRS specific BWP can be configured by a network (e.g., LMF). Alternatively, the PRS/SRS specific BWP can be configured within a PRS/SRS resource (including start frequency, and/or end frequency).

Alternatively, there can be a virtual wide bandwidth which including multiple RB set. Alternatively, a hop can be performed between two frequency adjacent RB sets. Alternatively, there can be a PRS/SRS resource on a RB set. Alternatively, a PRS/SRS resource can be configured on all RB sets. Alternatively, the number of hops can be configured by a network (e.g., LMF) while the virtual wide bandwidth is equally divided among hops/RB sets. Alternatively, the RB sets can be configured by a network (e.g., LMF).

With this method, a RedCap UE can receive part bandwidth (e.g., 20 MHz) of a repetition of PRS (e.g., 100 MHz). After that, this UE can concatenate each reception together to form a large bandwidth. After that, this UE can measure the concatenated PRS. With a larger concatenated bandwidth than a limited bandwidth (20 MHz), the performance of positioning for RedCap UE can be improved (e.g., the larger the bandwidth is, the higher positioning accuracy can be).

Implementation Example 5: Priority Process for Hopping of a RedCap UE

For a PRS measurement, a UE can be configured with measurement gap (MG, e.g., a period of time) or PRS processing window (PPW, e.g., a period of time).

For a RedCap UE with reception hopping of PRS, if the duration of all hops were short (e.g., two slots), one MG instance (or PPW instance) can be enough. If the duration of all hops were long (e.g., ten slots), multiple MG instances (or PPW instances) can be configured (but the number of instances can be limited to reduce signaling overhead, e.g., at most two instances). Alternatively, there can be an overlap in time between two instances of MG/PPW.

For reception hopping of PRS, some PRS reception may have collision with other higher priority signal(s)/channel(s). For example, for PRS reception with a PPW, the PRS may collide with synchronization signal block (SSB) which has a higher priority. Under this circumstance, one or more hops of the PRS reception may be dropped (e.g., last two hops of 5 hops are dropped).

For a SRS transmission with hopping of a half-duplexing of frequency divided duplexing (HD-FDD) UE, the SRS transmission may have a collision with physical downlink shared channel (PDSCH)/physical downlink control channel (PDCCH)/other downlink signal/channel. For such case, one or more hops of the SRS transmission may be dropped (e.g., last three hops of 5 hops are dropped), even the SRS transmission has higher priority. Alternatively, for a SRS transmission (e.g., period, semi-period, or a period transmission) from a HD-FDD UE, at least N (e.g., N=6) symbols can be required between a PDCCH that schedules a PDSCH and a SRS transmission. If not (e.g., a small N, e.g., N<6), the SRS transmission can be continued, even if the SRS has a lower priority. Alternatively, if not (e.g., a small N, e.g., N<6), the SRS transmission can be continued while the PDSCH is dropped, even if the PDSCH has higher priority.

Alternatively, if there is a collision between SRS transmission and physical uplink shared channel (PUSCH)/physical uplink control channel (PUCCH), the SRS transmission can be dropped if the SRS transmission had a lower priority. Alternatively, if there is a collision between SRS transmission and PUSCH/PUCCH, the SRS transmission can be dropped even if the SRS transmission had a higher priority. Alternatively, if (one hop of) PRS reception were outside of PPW/MG, a UE can continue to receive this (hop of) PRS. Alternatively, if the last hop of PRS reception were outside of PPW/MG, a UE can receive this hop of PRS.

Alternatively, in an uplink (or downlink) or sidelink, there can be a SRS transmission window (e.g., 10 slots) where there is only SRS transmission while there is no other signals/channels. Alternatively, in an uplink, a SRS measurement window (i.e., a period of time) can be configured for a gNB (or TRP) by a network (e.g., LMF). Within this window, a gNB (or TRP) can process SRS reception only. Alternatively, within this window, a gNB (or TRP) can process SRS for positioning only while it drops all other signal(s)/channel(s). Alternatively, in an uplink, a SRS processing window (i.e., a period of time) with signal/channel priority can be configured for a gNB (or TRP). Within this window, a gNB (or TRP) can process SRS reception according to signal/channel priority. For example, if a SRS has a higher priority than other signal(s)/channel(s), this SRS reception can be processed. For another example, if a SRS has a lower priority than one signal/channel, this SRS reception can be dropped. Alternatively, if the time gap between a SRS transmission and a scheduled (or configured) PUSCH/PUCCH/physical random access channel (PRACH) transmission were less than some time (e.g., one slot, e.g., 7 symbols), this SRS transmission can be processed. Alternatively, if the time gap between a SRS transmission and a scheduled (or configured) PUSCH/PUCCH/PRACH transmission were less than some time (e.g., one symbol), this SRS transmission can be processed while the other signal(s)/channel(s) can be dropped. Alternatively, if the time gap between a SRS transmission and a scheduled (or configured) PUSCH/PUCCH/PRACH transmission were less than some time (e.g., two symbols), this SRS transmission may be processed while the other signal(s)/channel(s) can be dropped even this SRS has a lower priority than other signal(s)/channel(s).

With this method, the PRS/SRS transmission can be ensured. Hence, the performance of positioning can be maintained or improved.

Implementation Example 6: Positioning Under
Carrier Aggregation (CA)

A downlink control information (DCI) in a PDCCH can
be used to trigger one SRS transmission for uplink channel
estimation. Alternatively, a DCI can be used to trigger SRS
transmission for positioning measurement for multiple cells
(or carriers, or frequency layers). Alternatively, one or more
reserved bits in a DCI can be used to trigger concurrent SRS
transmission (e.g., carrier aggregation, CA) for positioning
measurement for multiple carriers. For example, (the first, or
the last) three reserved bits can be used to indicate which
carrier can have (concurrent) SRS transmission (e.g., a value
of "1" represents SRS transmission. e.g., the first, second,
third bit are for the first, second, third carrier). For another
example, the first two reserved bits are used to indicate
which carrier cab have SRS transmission (e.g., a code point,
e.g., decimal value of bit(s), e.g., "00" for no trigger, "01"
for the first and second carrier can have concurrent SRS
transmission/CA, "10" for the second and third carrier can
have concurrent SRS transmission/CA, "11" for the first,
second and third carrier can have concurrent SRS transmis-
sion/CA. The decimal value of "00", "01", "10", "11" can be
0,1,2,3, respectively).
Alternatively, a bits combination in one or more fields in
DCI can indicate (concurrent) SRS transmission. For
example, for frequency domain resource allocation (FDRA)
field, if FDRA were all zero bits, the SRS transmission on all
the carriers can be concurrent (e.g., CA). For another
example, if FDRA were all zero bits, the first three bits of
modulation coding scheme (MCS) field can indicate which
SRS transmission on a carrier will be concurrent (or, which
SRS resource/SRS resource set on a carrier will be trans-
mitted in concurrent).
Alternatively, one or more reserved bits in a DCI can be
used to trigger concurrent PRS transmission on multiple
carriers (e.g., CA of PRS, or bandwidth aggregation of
positioning frequency layer) from a gNB (or TRP). Alter-
natively, one or more reserved bits in a DCI can be used to
trigger concurrent PRS reception on multiple carriers for a
UE. Alternatively, one or more reserved bits in a DCI can be
used to trigger concurrent PRS reception on multiple posi-
tioning frequency layers for a UE. Alternatively, a bits
combination in one or more fields in DCI can indicate
(concurrent) PRS transmission from a gNB (or TRP). Alter-
natively, a bits combination in one or more fields in DCI can
indicate (concurrent) PRS reception on multiple carriers for
a UE. Alternatively, a bits combination in one or more fields
in DCI can indicate (concurrent) PRS reception on multiple
positioning frequency layers for a UE.
A PDCCH that carries the DCI above can occupy 4, or 8,
or 16, or 32 control channel element (CCE) which has 4, 2,
1, 1 candidate(s), respectively. Alternatively, A PDCCH that
carries the DCI above can occupy 10, or 12, or 14, or 18, or
20, or 22, or 24, or 26, or 28 CCE which all of them have
one candidate (or candidate place).
Alternatively, the transmission power of PRS/SRS can be
equally allocated among multiple carriers. Alternatively, the
transmission power per RE (e.g., EPRE) of PRS/SRS can be
equally allocated among multiple carriers. Alternatively,
before transmission, if the total transmission power of SRS
would exceed the transmission power allowed for a UE, the
transmission power of SRS can be equally scaled and
allocated. Alternatively, before transmission, if the transmis-
sion power of SRS of each carrier would exceed the trans-
mission power allowed for the carrier of a UE, the transmission power of SRS can be equally scaled and allocated
which is determined by the carrier with a lowest allowed
EPRE.
With this method, the carrier aggregation of PRS/SRS can
be ensured which can provide more precise positioning
accuracy (e.g., a larger bandwidth means a higher position-
ing accuracy). Hence, the performance of positioning can be
improved.

Implementation Example 7: On Demanded
PRS/SRS for a RedCap UE

A UE (or gNB, or TRP) can request a network (e.g., LMF)
to configure an appropriate configuration for it for PRS
reception (or SRS transmission, that is, on demanded trans-
mission). After receiving this request, a network (e.g., LMF)
can configure a better configuration for a UE (or gNB, or
TRP).
A RedCap UE can request a PRS resource bandwidth for
a single hop (or each hop). A RedCap UE can request a total
PRS resource bandwidth for all the hops. Alternatively, a
RedCap UE can request a total PRS resource bandwidth for
all the hops after concatenation of these hops. Alternatively,
a RedCap UE can request a total PRS resource bandwidth
for all the hops after concatenation of these hops and after
removing the overlapped bandwidth. Alternatively, a Red-
Cap UE can request a total PRS resource bandwidth for all
the hops after concatenation of these hops without over-
lapped resource (or resource block (RB), e.g., if a bandwidth
of 20 MHz has 48 RB@SCS-30 kHz of PRS for each hop
with one RB in overlapping, there can be 6 hops, and the
requested total bandwidth can be (48−1)*(6−1)+48=283 RB.
Because 283 is greater than the bandwidth of 100 MHz
which has 272 RB for PRS, the final requested total band-
width can be 272 RB). Alternatively, a RedCap UE can
request a number of hops of PRS hopping. Alternatively, a
RedCap UE can request a number of hops of PRS transmis-
sion hopping. Alternatively, a RedCap UE can request a
number of hops and bandwidths for each hop of PRS
hopping. It can be helpful for positioning for 700 MHz band.
For a RedCap UE, a normal cyclic prefix of PRS/SRS can
be configured (or fixed). A request on cyclic prefix of PRS
can be invalid (e.g., not applicable, or not present). For a
RedCap UE, a Comb size N=2 (or N=1) of PRS/SRS can be
configured (or fixed). A request on Comb size of PRS can be
invalid.
For a RedCap UE, a short periodicity of PRS/SRS (e.g.,
one slot, two slots) can be requested. It may reduce a total
delay of measurement. Alternatively, for a RedCap UE, a
periodicity and offset of PRS/SRS can be requested (e.g., a
periodicity of $2^u$ slots, u=0, 1, 2, 3, 4, 5, 6 for SCS=15, 30,
60, 120, 240, 480, 960 kHz, respectively, the slot offsets are
0, 1, . . . , $2^u-1$. e.g., $2*2^u$ slots. e.g., $3*2^u$ slots).
For a RedCap UE, an intra-slot repetition factor of PRS/
SRS (e.g., 6 repetitions within a slot, or 6 repetitions within
12 symbols, each repetition has two contiguous symbols)
can be requested. With this method, a better channel esti-
mation can be achieved and, the measurement delay can be
reduced. For a RedCap UE, a number of PRS/SRS symbols
(e.g., 12 symbols) can be requested. Alternatively, it can be
multiple of Comb size (e.g., two of Comb size 2, e.g.,
2×2=4). Alternatively, it can be multiple of 2, 3, 4, or 6
within a slot. Alternatively, it can be multiple of 2, 3, 4, 6,
or 8 in case of two (or more) contiguous slots for PRS/SRS.
For a RedCap UE, a QCL information of PRS/SRS can be
configured (or fixed, e.g., QCL with SSB with Type C). A
request on QCL information of PRS can be invalid. Alternatively, for a RedCap UE, a QCL with tracking reference signal (TRS) or channel state information reference signal (CSI-RS) or TRS for UE under RRC_Inactive/RRC_Idle can be requested.

For a RedCap UE, a frequency information of PRS/SRS can be requested. For example, ARFCN of a hop (or ARFCN of all hops) can be requested. Alternatively, each hop may have a frequency information (e.g., ARFCN). For a RedCap UE, a duration of PRS/SRS for each hop (or all hops) can be requested.

A gNB (or TRP) can be requested with PRS transmission with hopping by a network (e.g., LMF) or a UE (via LMF). For example, after receiving a request from UE on PRS transmission with hopping, a network (e.g., LMF) can forward this request to a gNB (or TRP). For another example, after receiving a request from UE on PRS transmission with hopping, a network (e.g., LMF) can request a gNB (or TRP) on PRS transmission with hopping based on a request from the UE.

Alternatively, a request from UE (or gNB, or TRP) can be UE-specific (or TRP-specific), PRS/SRS-resource-specific, FR specific, or band specific, or carrier specific. Alternatively, a UE (or LMF) can request to gNB (or TRP) for a PRS transmission with a larger bandwidth. Alternatively, a UE (or LMF) can request to gNB (or TRP) for a PRS transmission with positioning frequency layer (PFL) aggregation (e.g., 3 PFL aggregation, 3×100 MHz=300 MHz). This large bandwidth can improve positioning accuracy. Alternatively, a LMF (or UE) can request to gNB (or TRP) for a SRS transmission with SRS carrier aggregation (e.g., 2 carriers aggregation, 2×100 MHz=200 MHz). In some embodiments, the SRS can be controlled by the gNB. The gNB can be requested.

With this method, a better configuration can be achieved for a RedCap UE (e.g., a wider bandwidth). Hence, the performance of positioning can be improved.

It should be understood that one or more features from the above implementation examples are not exclusive to the specific implementation examples, but can be combined in any manner (e.g., in any priority and/or order, concurrently or otherwise).

Figure 8:
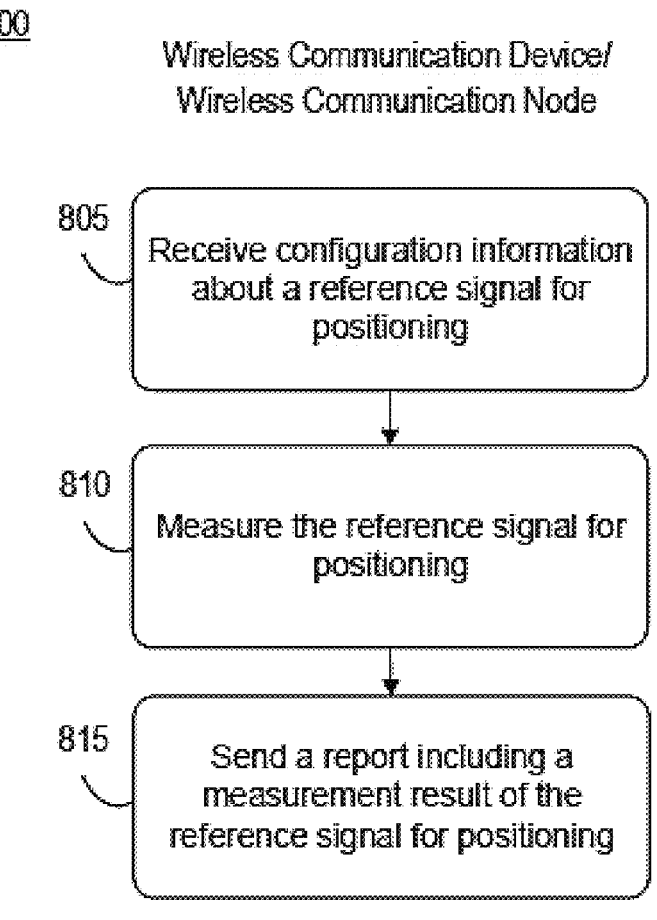
FIG. 8 illustrates a flow diagram of an example method for positioning, in accordance with an embodiment of the present disclosure.

FIG. 8 illustrates a flow diagram of a method 800 for carrier phase positioning. The method 800 may be implemented using any one or more of the components and devices detailed herein in conjunction with FIGS. 1-2. In overview, the method 800 may be performed by a wireless communication device or a wireless communication node, in some embodiments. Additional, fewer, or different operations may be performed in the method 800 depending on the embodiment. At least one aspect of the operations is directed to a system, method, apparatus, or a computer-readable medium.

A wireless communication device (e.g., a UE) may receive configuration information about a reference signal for positioning (e.g., a positioning reference signal (PRS)) from a wireless communication node. The wireless communication device may measure the reference signal for positioning. The wireless communication device may send a report including a measurement result of the reference signal for positioning to a network. The configuration information may indicate that when the wireless communication device reports its capability on a phase error group (PEG), the wireless communication device can be configured to report a corresponding phase error of the PEG.

In some embodiments, the configuration information may indicate that when the wireless communication device reports a carrier phase (CP) measurement result with a PEG, the wireless communication device can be configured to report a phase error of the PEG. The configuration information may indicate that when the wireless communication device reports a carrier phase (CP) measurement result with a PEG, the wireless communication device can be configured to report a phase error of the PEG and where in the PEG the phase error is estimated. The configuration information may indicate that, for signals on two adjacent symbols with different resource element (RE) offsets, sub-carriers within one or more resource blocks (RBs) can be overlapped.

In some embodiments, the wireless communication device can be configured to report a carrier phase (CP) on a nearest sub-carrier with a sub-carrier ID when there is no frequency center sub-carrier or direct current (DC) sub-carrier. When performing the measuring step, the wireless communication device may assume that a reference point of a CP measurement is an antenna connector of the wireless communication device. When performing the measuring step, the wireless communication device can be configured to deduce a CP value by assuming that a reference point of a CP measurement is an antenna phase center. When performing the measuring step, in response to identifying that a reference point of a CP measurement is an antenna phase center, the wireless communication device can be configured to deduce a CP value by assuming that the reference point of the CP measurement is an antenna connector of the wireless communication device. When performing the measuring step, in response to identifying that a reference point of a CP measurement is an antenna connector of the wireless communication device, the wireless communication device can be configured to deduce a CP value by assuming that the reference point of the CP measurement is an antenna phase center.

In some embodiments, a DC location index for a CP measurement on the reference signal can be configured by the network. The configuration information may indicate that the wireless communication device can be configured with a reference signal resource characterized with a comb size, a comb offset, and a number of repetitions within a slot. The configuration information may indicate that the wireless communication device can be configured with a number of repetitions of a reference signal resource and a start symbol index of a first one of the repetitions. The configuration information may indicate that the wireless communication device can be configured with a number of repetitions of slots of a reference signal resource having different comb offsets. The configuration information may indicate that the wireless communication device can be configured with a comb size one (e.g., comb size being one; CombSize=1; all the sub-carriers within a symbol are allocated to the PRS) with repetitions within a slot.

In some embodiments, when performing the measuring step, the wireless communication device can be configured to measure one or more hops or a conjunction of one or more hops of the reference signal. The report may further include an indication of combination of one or more hops associated with the measurement result. The report may further include an indication of frequency related information associated with the measurement result. The report may further include an indication of resource related information associated with the measurement result. The report may further include a measurement result on a conjunction of multiple segments of a reference signal resource. The report may further include a measurement result on a conjunction of multiple bandwidths of a reference signal resource. The wireless communication device can be requested to report a measurement result on which conjunction of one or more hops.

The wireless communication device can be requested to report a measurement result on an indicated frequency. The wireless communication device can be requested to report a measurement result on indicated bandwidths.

In some embodiments, in response to identifying a collision between a SRS transmission and a physical downlink shared channel (PDSCH), a physical downlink control channel (PDCCH), or other downlink signal/channel, the wireless communication device can be allowed to drop one or more hops of the SRS transmission. In response to identifying a collision between an SRS transmission and a physical downlink shared channel (PDSCH), a physical downlink control channel (PDCCH), or other downlink signal/channel, the wireless communication device can be allowed to continue the SRS transmission even if a corresponding SRS has a lower priority. If one hop of receiving the reference signal is outside of PPW/MG, the wireless communication device can be allowed to continue receiving one or more other hops of the reference signal. One or more reserved bits in downlink control information (DCI) received by the wireless communication device can be configured to trigger concurrent SRS transmissions for multiple carriers. A combination of bits in one or more fields in DCI received by the wireless communication device may indicate concurrent SRS transmission on multiple carriers.

In some embodiments, one or more reserved bits in DCI received by the wireless communication device can be configured to trigger concurrent receptions for the reference signal on multiple positioning frequency layers.

In some embodiments, a combination of bits in one or more fields in DCI received by the wireless communication device may indicate concurrent receptions for the reference signal on multiple positioning frequency layers. The wireless communication device, as a RedCap UE, can be allowed to request a number of hops of a PRS transmission. On-demand PRS transmission procedure may allow the LMF to control and decide whether PRS is transmitted or nor and to change the characteristics of an ongoing PRS transmission. The on-demand PRS transmission procedure can be initiated by the UE or LMF. The actual PRS changes can be requested by the LMF irrespective of whether the procedure is UE- or LMF-initiated.

In some embodiments, the wireless communication device, as a RedCap UE, can be allowed to request an intra-slot repetition factor of the reference signal. The wireless communication device, as a RedCap UE, can be allowed to request a frequency information of the reference signal.

In some embodiments, a wireless communication node may receive configuration information about a reference signal for positioning from a wireless communication device. The wireless communication node may measure the reference signal for positioning. The wireless communication node may send a report including a measurement result of the reference signal for positioning to a network. The configuration information may indicate that when the wireless communication node reports a CP measurement result, the wireless communication node can be configured to report a phase error of a MIMO SRS port. The configuration information may indicate that when the wireless communication node reports a CP measurement result, the wireless communication node can be configured to report a phase error of a MIMO SRS port with a port ID. The configuration information may indicate that when the wireless communication node reports a CP measurement result, the wireless communication node can be configured to report a phase error of a MIMO SRS port with a hopping ID. The configuration information may indicate that when the wireless communication node reports a CP measurement result, the wireless communication node can be configured to report a phase error of a MIMO SRS port with a PEG ID. The configuration information may indicate that when the wireless communication node reports a CP measurement result, the wireless communication node can be configured to report a phase error of a MIMO SRS port with a SRS resource ID. The configuration information may indicate that when the wireless communication node reports a CP measurement result, the wireless communication node can be configured to report SRS related configuration information. The SRS related configuration information may include at least one of: a band, a carrier index, an absolute radio frequency channel number (ARFCN), a carrier center frequency, a carrier center frequency of a hop, a start frequency of a hop, an end frequency of a hop, a bandwidth of this carrier, a bandwidth of a hop being measured, a hopping ID.

In some embodiments, within a SRS measurement window, the wireless communication node can be configured to process SRS reception only while the wireless communication node drops all other signal(s) or channel(s). Within a SRS processing window, upon identifying that a time gap between a SRS transmission and a PUSCH/PUCCH/PRACH transmission is less than a duration, the wireless communication node can be configured to continue processing the SRS transmission and drop other signal(s) or channel(s) even if a corresponding SRS has a lower priority. The wireless communication node can requested by the network to measure a CP with a PEG within a TEG when the wireless communication node performs a timing related measurement. The configuration information may indicate that a symbol with index $\{\{S, S+1, \ldots, S+L-1\}+i*L\}$ can be allocated to a PRS, where, i is an integer of $\{0, 1, 2, \ldots, R-1\}$, R is a number of repetitions within a slot, L is a number of symbols of the PRS, and S is a start symbol index. In some embodiments, the measurement may include: when a TRP measures a relative time of arrival (RTOA), a RTOA reference time may include a nominal beginning time of system frame number 0 provided by a system frame number initialization time of a first hop. The measurement may include: a TRP can be requested with a PRS transmission with a positioning frequency layer (PFL) aggregation.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:
receiving, by a reduced capability (RedCap) device from a wireless communication node, information associated with sounding reference signal (SRS) hopping, via a radio resource control (RRC) signaling,
wherein the RRC signaling includes frequency resource related information which indicates a start resource block (RB) number and a number of overlapped RB;
wherein the RRC signaling further includes time resource related information which indicates at least one of a periodicity or a slot offset for each hop; and
transmitting by the RedCap device, a SRS outside a configured bandwidth part (BWP).

2. The wireless communication method of claim 1, further comprising:
transmitting, by the RedCap device, the SRS in a SRS transmission window where no other signal is transmitted.

3. The wireless communication method of claim 1 further comprising:
determining, by the RedCap device, to drop the SRS if the SRS collides with a physical uplink shared channel (PUSCH) or a physical uplink control channel (PUCCH).

4. A reduced capability (RedCap) device, comprising:
at least one processor configured to:
receive, via a transceiver from a wireless communication node, information associated with sounding reference signal (SRS) hopping, via a radio resource control (RRC) signaling, wherein the RRC signaling includes frequency resource related information which indicates a start resource block (RB) number and a number of overlapped RB;

wherein the RRC signaling further includes time resource related information which indicates at least one of a periodicity or a slot offset for each hop; and transmit, via the transceiver, a SRS outside a configured bandwidth part (BWP).

5. The RedCap device of claim 4, wherein the at least one processor is configured to:

transmit, via the transceiver, the SRS in a SRS transmission window where no other signal is transmitted.

6. The RedCap device of claim 4, wherein the at least one processor is configured to:

determine to drop the SRS if the SRS collides with a physical uplink shared channel (PUSCH) or a physical uplink control channel (PUCCH).

7. A wireless communication method, comprising:

sending, by a wireless communication node to a reduced capability (RedCap) device, information associated with sounding reference signal (SRS) hopping, via a radio resource control (RRC) signaling, wherein the RRC signaling includes frequency resource related information which indicates a start resource block (RB) number and a number of overlapped RB;

wherein the RRC signaling further includes time resource related information which indicates at least one of a periodicity or a slot offset for each hop; and receiving, by the wireless communication node from the RedCap device, a SRS outside a configured bandwidth part (BWP).

8. The wireless communication method of claim 7, further comprising:

receiving, by the wireless communication node from the RedCap device, the SRS in a SRS transmission window where no other signal is transmitted.

9. A wireless communication node, comprising at least one processor configured to perform the method of claim 7.

10. A wireless communication node, comprising at least one processor configured to perform the method of claim 8.

* * * * *